INVENTORS.
HENRY A. COOK
JERROLD E. RADWAY

ATTORNEYS

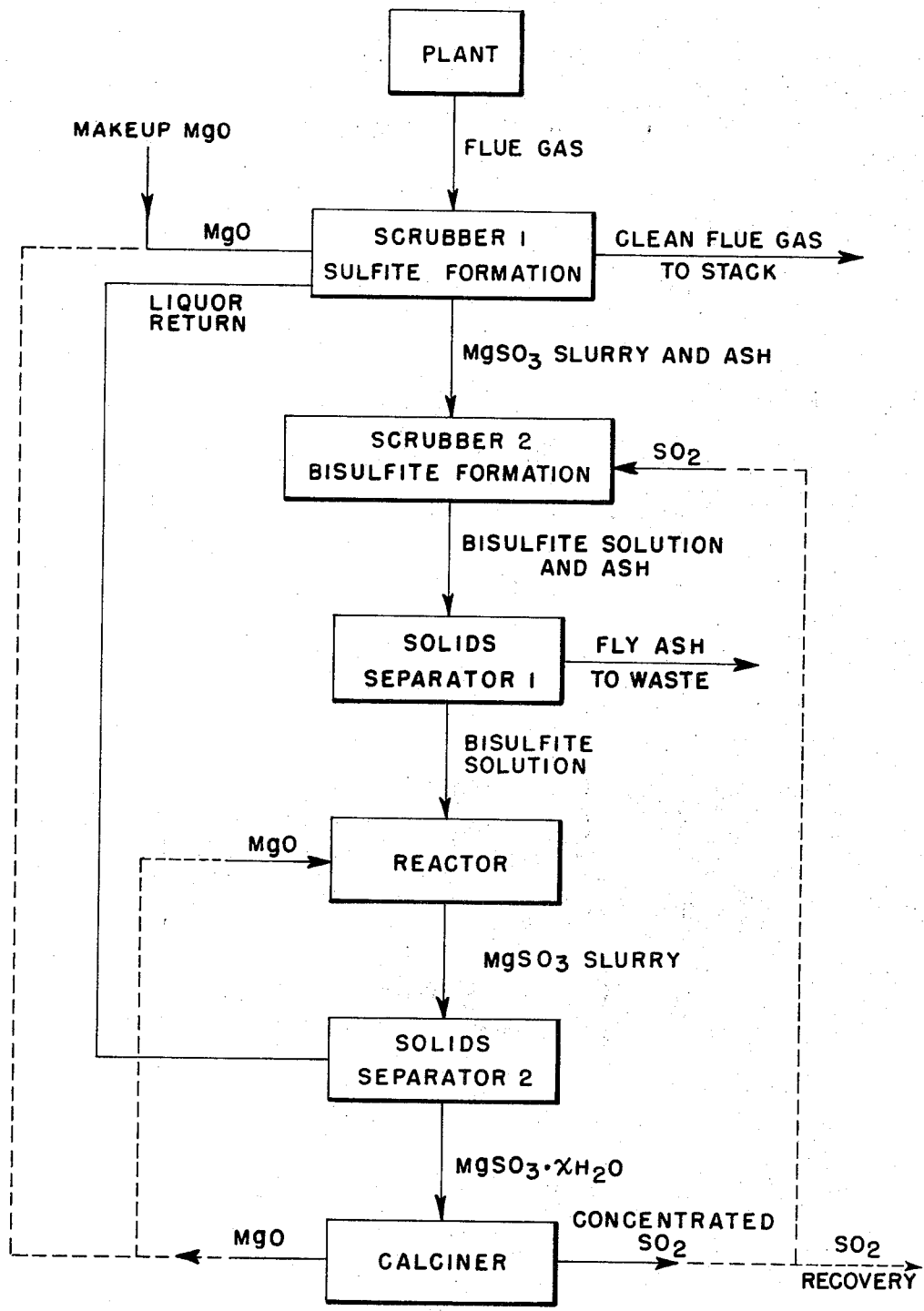

United States Patent Office 3,826,812
Patented July 30, 1974

3,826,812
TREATMENT OF FLUE GASES AND THE LIKE
Henry A. Cook, Fremont, and Jerrold E. Radway, Westlake, Ohio, assignors to Basic Incorporated, Cleveland, Ohio
Filed Oct. 22, 1971, Ser. No. 191,888
Int. Cl. C01b 17/00
U.S. Cl. 423—242
10 Claims

ABSTRACT OF THE DISCLOSURE

A process is described for simultaneously scrubbing fly ash and sulfur oxides from flue gases. The flue gases are treated with an aqueous mixture of a metal oxide, hydroxide or carbonate which forms a suspension of an insoluble or partially soluble metal sulfite and fly ash thereby removing said sulfur oxides and fly ash from the flue gases. The insoluble sulfite is converted to the soluble bisulfite to facilitate separation of the solid fly ash and insoluble impurities, and the sulfur oxide and metal oxide are subsequently recovered from the bisulfite solution.

BACKGROUND OF THE INVENTION

This invention relates generally to a process for the removal of undesirable ingredients in plant stack gases, and more preferably, to a procedure for simultaneously removing fly ash and sulfur oxides from flue gases.

The problem of air pollution has been with us for many years, and public awareness of this problem has been steadily increasing over the recent years. Accordingly, there has been increased pressure on industry to devise methods for reducing air pollution of all types, including pollution which results from the emission of power plant, smelter and chemical plant stacks. The gases emitted from these stacks often contain various gaseous chemicals and act as a carrier for solid particles commonly referred to as fly ash. The undesirable features of the solid fly ash materials are obvious to those in the vicinity of such plant stacks who have experienced the results of a "fall-out." The pollution resulting from the presence of gaseous chemicals within the flue gas is less apparent, but such gases may subsequently corrode metal objects with which they come in contact and pollute streams and rivers when precipitated from the atmosphere such as during rain-storms. Damage to and destruction of plant and animal life also results.

In addition to the undesirable side effects on the environment, the emission of the gaseous chemicals represents a loss of potential income. That is, the recovery of some of these gaseous chemicals either as such or in reacted form could result in a supply of useful chemicals.

One such group of gaseous chemicals which are found in relative abundance in flue gases from especially coal burning power plants are the sulfur oxides such as sulfur dioxide. Sulfur dioxide recovered from flue gases can be utilized in the preparation of a number of chemicals such as sulfuric acid or elemental sulfur. One of the difficulties in preparing such chemicals from sulfur dioxide recovered from flue gases has been related to the recovery costs involved in treating dilute concentrations, i.e., about 0.1% to 0.5%. In other words, the recovery process must be inexpensive enough to provide an inexpensive and relatively clean concentrated source of sulfur dioxide.

One method for simultaneously removing both the fly ash and sulfur oxides from flue gases which has been utilized involves scrubbing the gases with an alkaline material which reacts with the sulfur oxides. However it has been difficult to remove the fly ash from the alkaline material, and impurities in the fly ash appear to interfere with the reversible reaction for the recovery of pure sulfur dioxide. Present practice, therefore, is to install two gas cleaning units, the first using a water scrubber or an electrostatic precipitator to remove fly ash from the gases, and the second unit is a scrubber containing an alkaline material to remove sulfur dioxide. U.S. Pat. 3,577,219 describes such a process for recovering sulfur dioxide from waste gases wherein the solid ash materials are removed prior to treatment with alkaline slurry of magnesium oxide and sulfite in water. This requires the use of two necessarily large units since all of the stack gas must be passed through both units to remove both items from the gas. This method, though quite useful, is expensive and requires substantial space, engineering, foundations, structure, etc.

SUMMARY OF THE INVENTION

These and other problems of removing fly ash and sulfur oxides from flue gases are overcome by the process of this invention which comprises the steps of:

a. treating the flue gas with an aqueous mixture of a metal oxide, hydroxide or carbonate which forms a mixture of a metal sulfite and fly ash in water, which metal sulfite subsequently can be converted to a water soluble metal bisulfite.
b. treating the sulfite mixture with additional sulfur dioxide to convert the sulfite to a water-soluble metal bisulfite,
c. separating the solid fly ash from the bisulfite solution, and
d. recovering concentrated sulfur dioxide from the bisulfite solution.

Group II metal oxides, hydroxides and carbonates, which form water-insoluble sulfites and water soluble bisulfites are useful. A particularly useful metal compund is magnesium oxide. In the process of this invention, the recovery of the sulfur dioxide also results in the recovery of the metal in the form of a metal oxide. The metal oxide can be recycled into the process or converted into other metal compounds. In view of this recovery of the metal oxide and the sulfur dioxide, the process of this invention is economical and commercially attractive. Since the ash and sulfur dioxide are removed from the flue gas at the same time, only one large scrubber is required. In this invention, the term fly ash is used in its generic sense and includes all solid particulate matter found in industrial gases such as combustion gases.

BRIEF DESCRIPTION OF THE DRAWINGS

FIG. 2 is a more detailed schematic flow sheet illustrating the process with magnesium oxide as the metal reactant.

DESCRIPTION OF THE PREFERRED EMBODIMENTS

Figure 1:
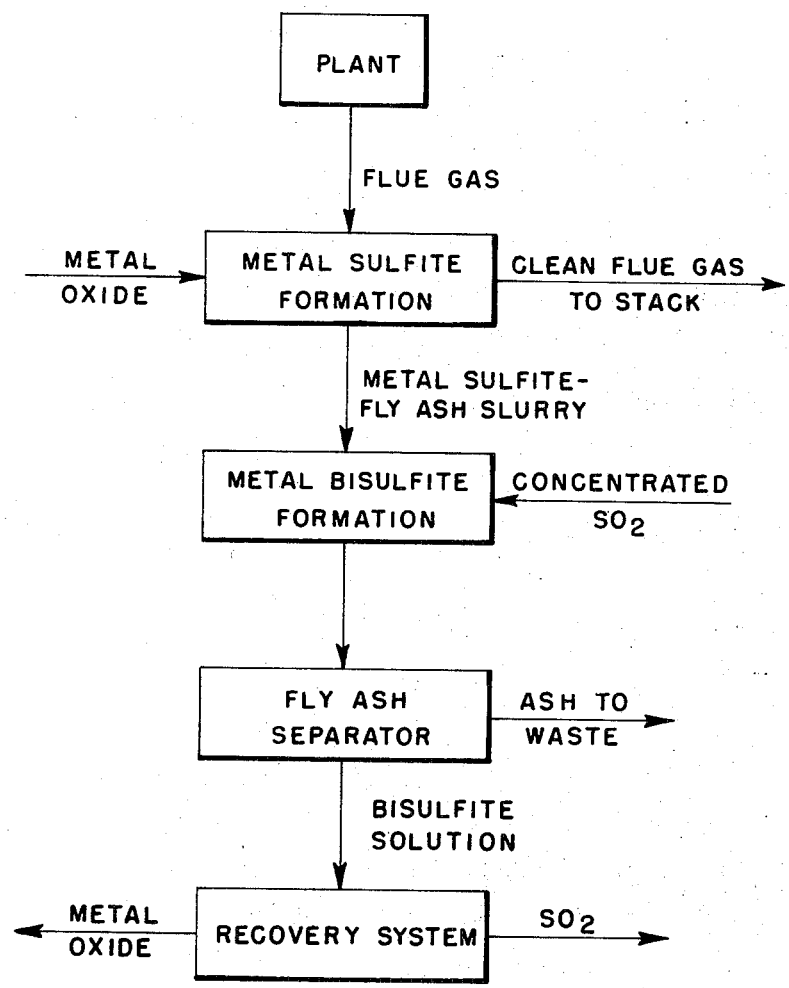
FIG. 1 is a schematic flow sheet illustrating the general process of this invention.

In the process of this invention, the flue gases are treated with an aqueous suspension of a Group II metal compound which reacts with the sulfur oxides in the flue gases to form an aqueous suspension of a metal sulfite and fly ash. More specifically, the metal compounds which are utilized for the treatment of the flue gases are those which form insoluble or slightly soluble metal sulfites which can be converted to soluble metal bisulfites. The conversion to the soluble bisulfite permits the ready separation of the fly ash and other insoluble impurities from the sulfur compound thereby facilitating the ultimate recovery of the sulfur oxides and metal oxides without contamination by the ash material. Alkaline earth metal oxides, hydroxides and carbonates of calcium, barium and magnesium are useful. Zinc is another example of a useful Group II metal. A particularly useful metal derivative in the process of the invention is magnesium oxide which reacts readily with sulfur dioxide to form magnesium sulfite, and on further reaction with sulfur dioxide forms a soluble magnesium bisulfite. Magnesite ($MgCO_3$) and dolomite [$CaMg(CO_3)_2$] also are useful oxide sources. After separation of the solid fly ash, the metal oxide and the sulfur dioxide are readily recovered from the bisulfite solution.

Various steps in the process of this invention are illustrated in the drawings. A general outline of the process is presented in FIG. 1. Flue gas from a plant such as a power plant containing fly ash and sulfur oxides is treated with a metal oxide in water to precipitate the sulfur oxides as an insoluble or only slightly soluble metal sulfite. This slurry of sulfite and fly ash in water is then treated with concentrated sulfur dioxide to form a soluble metal sulfite. Separation of the fly ash and other solid impurities from the bisulfite solution is accomplished easily by known techniques such as filtration. The bisulfite solutions, now free of fly ash, is treated in a manner to facilitate recovery of the sulfur dioxide and the metal oxide.

A more detailed procedure is illustrated in FIG. 2. For convenience and illustration, magnesium oxide is used as an example of the metal oxide. Flue gas which is released from a power plant comprising fly ash and dilute sulfur dioxide (for example up to about 2%) is passed into Scrubber 1 which contains an aqueous suspension of active magnesium oxide maintained at a pH of about 8 to ensure rather complete scavenging of the sulfur dioxide as the insoluble magnesium sulfite. The fly ash is entrapped in the aqueous suspension and the sulfur dioxide reacts with the magnesium oxide to form magnesium sulfite in accordance with the following reaction.

(1a)   $MgO + SO_2 + xH_2O \rightarrow MgSO_3 \cdot xH_2O$

The letter "$x$" represents the number of moles of water. Magnesium sulfite can exist in various hydrated forms (e.g., tri or hexahydrate) depending on the conditions. Since magnesium oxide in water forms magnesium hydroxide, the reaction also may be represented as follows.

(1b)   $Mg(OH)_2 + SO_2 + xH_2O \rightarrow MgSO_3 \cdot (x+1)H_2O$

The concentration of magnesium oxide in the slurry in Scrubber 1 should be sufficient to react with all of the sulfur dioxide present in the incoming flue gas. It has been observed that the amount of magnesium oxide needed in Scrubber 1 can be determined by monitoring the pH of the slurry within the scrubber. Since the sulfite is preferentially formed in alkaline media, the water slurry in Scrubber 1 should be on the basic side and preferably at a pH between about 7.0 to 10.5. The pH is maintained at this desired level by periodic or continuous addition of the required amount of magnesium oxide. The use of an excess of magnesium oxide (or hydroxide) is not harmful or wasteful since it is carried along in the process and converted to the soluble bisulfite at the same time as the magnesium sulfite is converted to the soluble bisulfite with concentrated sulfur dioxide gas in Scrubber 2. Thus, it can be recovered in the calcination step and returned to Scrubber 1 as needed for further reaction. Concentrations of about 1 to 5% of metal oxide in water have been found useful in this invention.

When the suspension in Scrubber 1 has reached a suitable concentration of solid magnesium sulfite, a portion or all of the suspension is passed to Scrubber 2 where concentrated sulfur dioxide gas is brought into contact with the suspension to dissolve the solid magnesium sulfite (and unreacted magnesium oxide) and form a solution of magnesium bisulfite in accordance with the following reactions. The pH of the solution in Scrubber 2 is maintained on the acid side, preferably below about 5.

(2a)   $MgSO_3 \cdot xH_2O + SO_2 \rightarrow Mg(HSO_3)_2 + (x-1)H_2O$ (2b)   $MgO + 2SO_2 + xH_2O \rightarrow Mg(HSO_3)_2 + (x-1)H_2O$ Concentrated sulfur dioxide gas (5-95% $SO_2$) is utilized to insure the formation of a concentrated solution of bisulfite and to magnify the differences in solubility between the magnesia and the impurities.

The next step in the process of this invention involves the removal of the solid fly ash from the bisulfite solution in Solids Separator 1. Any other solid impurities which may be present in the makeup of magnesium oxide are also removed in this step. The separation can be effected by known methods such as through the use of a centrifuge or by filtration.

The bisulfite solution, free of ash and other solid impurities, is then passed into a reactor where it is treated with magnesium oxide to again form solid magnesium sulfite in accordance with the following reaction.

(3)   $Mg(HSO_3)_2 + MgO + (2x-1)H_2O \rightarrow 2MgSO_3 \cdot xH_2O$

The solid hydrated magnesium sulfite is separated from the mother liquor by known methods such as by filtration at Solids Separator 2 and the filtrate is recycled back to Scrubber 1 for additional treatment. The hydrated magnesium sulfite filter cake is calcined to form active magnesium oxide and concentrated (5 to 95%) sulfur dioxide gas. Calcination may be carried out in a reducing atmosphere to ensure conversion of any magnesium sulfate which may be present to magnesium oxide. Solid carbonaceous material may be added to the calcination for this purpose. As shown in FIG. 2, the active magnesium oxide can be recycled back to Scrubber 1 for absorption of more sulfur dioxide from the flue gas or utilized in the Reactor to convert the bisulfite to the insoluble sulfite form. Likewise, a portion of the recovered sulfur dioxide can be recycled back to Scrubber 2 for converting magnesium sulfite to magnesium bisulfite. The remainder of the sulfur dioxide can be used for the manufacture of sulfuric acid or of elemental sulfur.

In a preferred embodiment, the hydrated magnesium sulfite which is obtained from Solids Separator 2 of the drawing is subjected to a drying and dehydration step prior to calcination. It has been found that the separate drying and dehydration step prior to calcination is desirable if the sulfur dioxide content of the gas obtained from calcination is to be at a maximum. Also, it has been found to be desirable to wash the magnesium sulfite crystals prior to calcination to remove minor amounts of metal salts which may be present such as those of sodium and potassium.

The calcination of the magnesium sulfite can be carried out in any of several calcination devices commercially available. Rotary kilns, fluidized bed calciners and multiple-hearth furnaces are suitable for such use.

It has been found also that it is possible to recover sulfur dioxide directly from the filtered bisulfite solution thus avoiding the expense and time required in converting the bisulfite to the insoluble sulfite in the Reactor. The sulfur dioxide is recovered by increasing the differential partial pressure of sulfur dioxide between the solution and the gas phases. In this optional process, the bisulfite solution may be heated with or without a vacuum or a vacuum can be applied without heating the solution. The result is the evolution of pure sulfur dioxide and the precipitation of hydrated magnesium sulfite in accordance with the following reaction.

(4)   $Mg(HSO_3)_2 + xH_2O \rightarrow MgSO_3 \cdot (x+1)H_2O + SO_2$

The hydrated magnesium sulfite obtained in this manner can be subjected to the calcination step to recover magnesium oxide and additional sulfur dioxide. Advantages of this optional procedure include the formation of purer and more concentrated sulfur dioxide, and the ability to calcine in a smaller calcinator with reduced heating costs since only half of the sulfur oxide is tied up as the sulfite.

The invention is illustrated further by the following specific but non-limiting example of a cyclic continuous process.

EXAMPLE

Following the general procedure illustrated in the FIG. 2, 448,000 standard cubic feet of flue gas from a coal burning power plant containing about 190 lbs. of sulfur dioxide and 192 lbs. of fly ash (3 grains/SCR-dry) is passed into a scrubber containing a magnesium oxide slurry at a pH of about 8.0 and comprising initially about 119 lbs. of magnesium oxide in 6,688 lbs. of water. A portion comprising 68,432 lbs. of water, 6,760 lbs. magnesium sulfite hexahydrate and 2,052 lbs. of fly ash is recirculated within Scrubber 1. In actual practice, therefore, the slurry in Scrubber 1 contains magnesium sulfite and possibly magnesium sulfate in addition to the magnesium oxide. The gas passing through Scrubber 1 is passed to the stack. Over 99% of the fly ash and 95% of the sulfur dioxide is removed from the gas in Scrubber 1.

A second portion of the slurry composition formed in Scrubber 1 comprising 6,368 lbs. of water, 631 lbs. of magnesium sulfite hexahydrate and 192 lbs. of fly ash is passed into the first stage of Scrubber 2 (a two stage countercurrent scrubber) where the final traces of $SO_2$ are removed from the calcinator gas used in the second stage of Scrubber 2 since excess $SO_2$ in the second stage passes into the first stage with the calcinator gas. The pH of the liquid in the first stage of Scrubber 2 is maintained at about 7.5–8.0. Magnesium oxide may be added to maintain this pH. The magnesium sulfite slurry from the first stage of Scrubber 2 is passed into the second stage of Scrubber 2 wherein 7100 standard cubic feet of a calciner off-gas mixture containing 15% sulfur dioxide (190 lbs.) is introduced. The pH of the solution within the second stage of Scrubber 2 is maintained at between 2 and 6 and preferably is at about 3.5. The bisulfite solution formed therein contains about 192 lbs. of dispersed fly ash and about 554 lbs. of magnesium bisulfite dissolved in 6,635 lbs. of water. This mixture is filtered in Solids Separator 1 and the residue is washed with water to remove any occluded bisulfite from the fly ash.

The bisulfite solution filtrate is passed into the Reactor where there is added 119 lbs. of magnesium oxide to form the insoluble magnesium sulfite hexahydrate which is separated from the liquor by centrifuging at Solids Separator 2. The liquor is recycled to Scrubber 1. The solid magnesium sulfite hexahydrate is placed in a dryer and dehydrated leaving about 622 lbs. of anhydrous magnesium sulfite. The anhydrous magnesium sulfiite is calcined by heating on a rotary kiln to about 950° to 1000° C., and 380 lbs. of sulfur dioxide gas (15% concentration) and about 238 lbs. of magnesium oxide are obtained. A portion of the sulfur dioxide gas is recycled to Scrubber 2 and the remaining sulfur dioxide gas is used to prepare sulfuric acid or elemental sulfur. The magnesium oxide is recycled to Scrubber 1 and into the Reactor.

Other modes of applying the principles of the process of this invention may be employed. As mentioned previously, it is possible to recover some pure sulfur dioxide from the magnesium bisulfite solution by heating the solution with or without a vacuum resulting in the precipitation of magnesium sulfite crystals which can then be calcined to form additional sulfur dioxide and magnesium oxide.

The process of the invention described above provides an economical and efficient method of removing and recovering sulfur dioxide from flue gases. Because the flue gas is required to pass through one scrubber only, there can be a significant reduction in the size of the second scrubber through which only a small amount of gas passes. This enables the use of smaller equipment which requires less space, engineering, foundations, structure, etc. and power input to operate.

The embodiments of the invention in which an exclusive property or privilege is claimed are defined as follows:

1. A process for simultaneously removing fly ash and sulfur oxides from flue gases and recovering sulfur dioxide which comprises the steps of
   a. treating the flue gas with an aqueous mixture of a Group II metal oxide, hydroxide, or carbonate which reacts with the sulfur oxides to form a mixture of metal sulfite, fly ash and other impurities in water, which metal sulfite subsequently can be converted to a water-soluble metal bisulfite,
   b. treating the sulfite mixture with additional concentrated sulfur dioxide gas to convert the sulfite to a water-soluble metal bisulfite,
   c. separating the solid fly ash and other solid impurities from the bisulfite solution,
   d. recovering sulfur dioxide from the bisulfite solution, and
   e. recycling a portion of the recovered sulfur dioxide for treating the sulfite mixture according to step (b).

2. The process of claim 1 wherein the metal is a Group II metal oxide capable of forming a soluble metal bisulfite in step (b).

3. The process of claim 1 wherein the sulfur dioxide and the metal oxide are recovered from the bisulfite solution after separation of the fly ash in step (c) by precipitation of magnesium sulfite and calcination of the precipitate.

4. A process for simultaneously removing fly ash and sulfur dioxide from flue gases and recovering the sulfur dioxide which comprises the steps of
   a. treating the flue gas with an aqueous mixture of magnesium oxide to form a suspension of magnesium sulfite and fly ash in water.
   b. treating the sulfite and ash suspension with concentrated sulfur dioxide to convert the sulfite to the water-soluble magnesium bisulfite,
   c. separating the solid fly ash and other solid impurities from the bisulfite solution,
   d. treating the bisulfite solution with additional magnesium oxide to form a precipitate of magnesium sulfite,
   e. separating the solid magnesium sulfite from the liquid,
   f. calcining the magnesium sulfite to form magnesium oxide and sulfur dioxide, and
   g. recycling a portion of the recovered sulfur dioxide for treating the sulfite mixture according to step (b).

5. The process of claim 4 wherein the magnesium sulfite is washed with water prior to calcining.

6. The process of claim 4 wherein the separated magnesium sulfite is dried and dehydrated prior to calcination.

7. The process of claim 4 wherein impure magnesium oxide is used in step (a) and beneficiated magnesium oxide is removed in step (f).

8. The process of claim 4 wherein the magnesium oxide recovered in step (f) is recycled and used in steps (a) and (d).

9. A process for simultaneously removing fly ash and sulfur dioxide from flue gases and recovering the sulfur dioxide which comprises steps of:
   a. scrubbing the flue gas with an aqueous mixture containing magnesium oxide, magnesium hydroxide, or mixtures of said oxide or hydroxide with magnesium sulfite whereby the sulfur dioxide reacts with the magnesium oxide or magnesium hydroxide to form additional magnesium sulfite or magnesium sulfate in the aqueous mixture;
   b. treating a portion of the slurry formed in step (a) containing magnesium sulfite and fly ash with concentrated sulfur dioxide to convert the sulfite to the water-soluble magnesium bisulfite;
   c. separating the solid fly ash and other solid impurities from the bisulfite solution;
   d. treating the clear bisulfite solution with additional magnesium oxide to precipitate magnesium sulfite;

e. separating the solid magnesium sulfite from the liquid;

f. recycling the liquid obtained in step (e) to the scrubbing solution utilized in step (a);

g. calcining the solid magnesium sulfite at a temperature of about from 400 to about 1200° C. to form solid magnesium oxide and gaseous sulfur dioxide;

h. forming a slurry of the recovered solid magnesium oxide for addition to the scrubbing solution utilized in step (a) and for precipitating magnesium sulfite in step (d), i. recycling a portion of the recovered sulfur dioxide gas in step (g) to form the water soluble magnesium bisulfite in step (b), and j. recovering the remaining sulfur dioxide formed in calcination step (g).

10. The process of claim 9 wherein the separated magnesium sulfite of step (e) is dried and dehydrated prior to calcination.

References Cited

UNITED STATES PATENTS

| | | | |
|---|---|---|---|
| 3,632,305 | 1/1972 | Hardison | 423—242 X |
| 3,617,212 | 11/1971 | Shah | 423—540 X |
| 2,073,039 | 3/1937 | Wilton et al. | 423—242 |
| 3,687,623 | 8/1922 | Terrana et al. | 423—539 |
| 3,428,420 | 2/1969 | Douglas et al. | 423—519 |
| 2,351,780 | 6/1944 | Palmrose | 423—519 |
| 3,615,165 | 10/1971 | Clement | 423—242 |

GEORGE O. PETERS, Primary Examiner

U.S. Cl. X.R.

423—519, 542